H. J. MAKOWSKI.
ROTARY VALVE.
APPLICATION FILED JULY 8, 1919.

1,362,721. Patented Dec. 21, 1920.
2 SHEETS—SHEET 1.

INVENTOR
Herman J. Makowski
BY
Strong & Townsend
ATTORNEYS

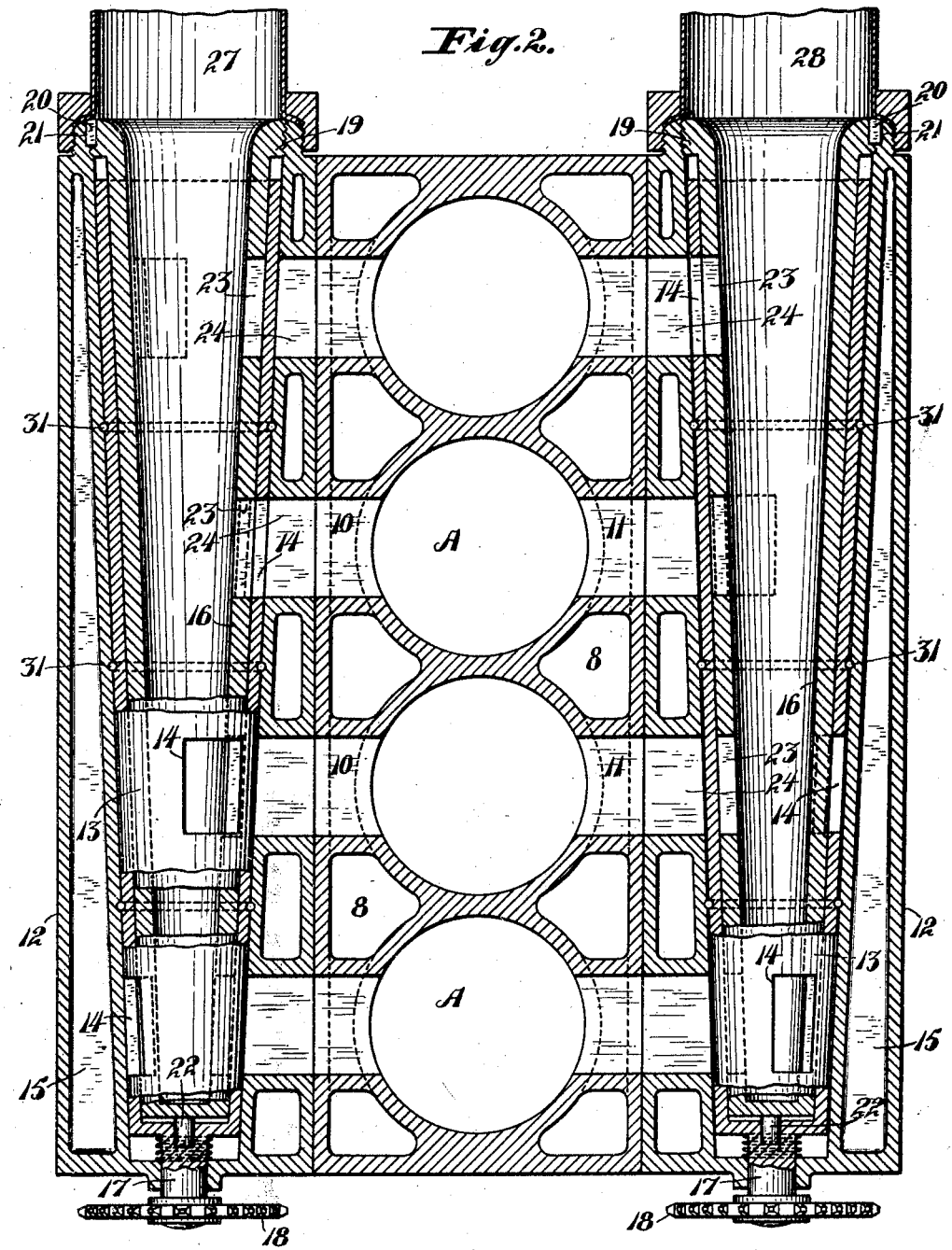

UNITED STATES PATENT OFFICE.

HERMAN J. MAKOWSKI, OF SAN FRANCISCO, CALIFORNIA.

ROTARY VALVE.

1,362,721.      Specification of Letters Patent.      Patented Dec. 21, 1920.

Application filed July 8, 1919. Serial No. 309,383.

*To all whom it may concern:*

Be it known that I, HERMAN J. MAKOWSKI, a citizen of the United States, residing at the city and county of San Francisco and State of California, have invented new and useful Improvements in Rotary Valves, of which the following is a specification.

This invention relates to a valve and especially to a valve of the rotary type, adapted for use in internal combustion engines and the like.

One of the objects of the present invention is to provide a simple and substantial rotary valve, particularly adapted for internal combustion engines, which is practically noiseless in operation, adapted to operate in conjunction with high speed engines and provided with inlet and exhaust ports of large area to permit efficient charging and scavenging of the cylinders.

Another object of the invention is to provide an inlet and an exhaust valve positioned one on each side of the cylinder heads. Further, to provide means for water-cooling the valves and for driving the same in unison.

Further objects will hereinafter appear.

The invention consists of the parts and the construction, combination and arrangement of parts as hereinafter more fully described and claimed, having reference to the accompanying drawings, in which—

Fig. 2 is a plan section taken on line 2—2, Fig. 1.

Figure 1:
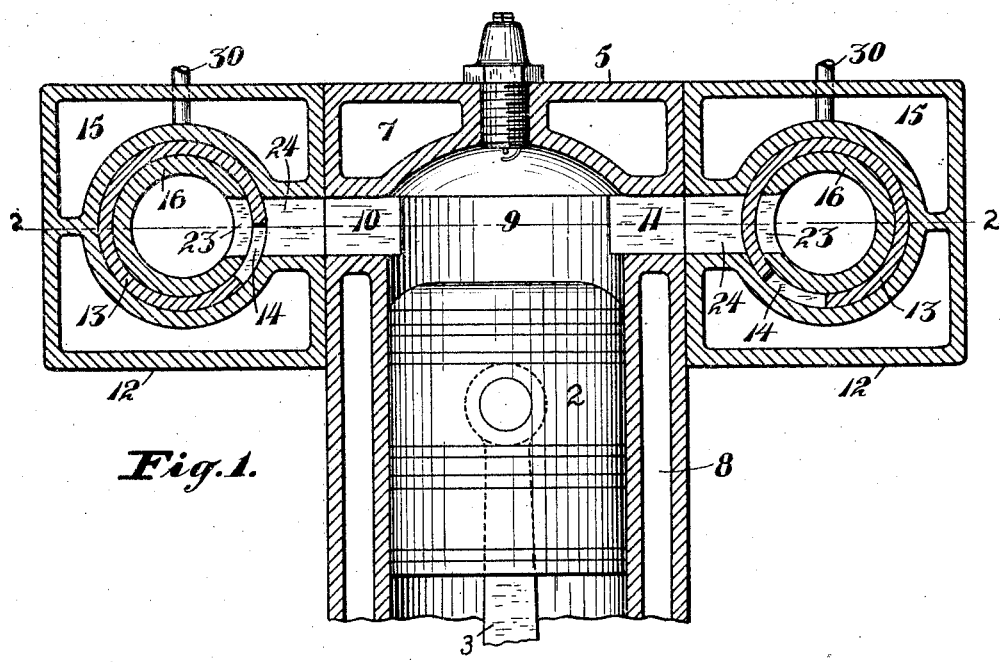
Figure 1 is a central vertical cross section of an engine showing the position of the rotary valves.
Figure 3:
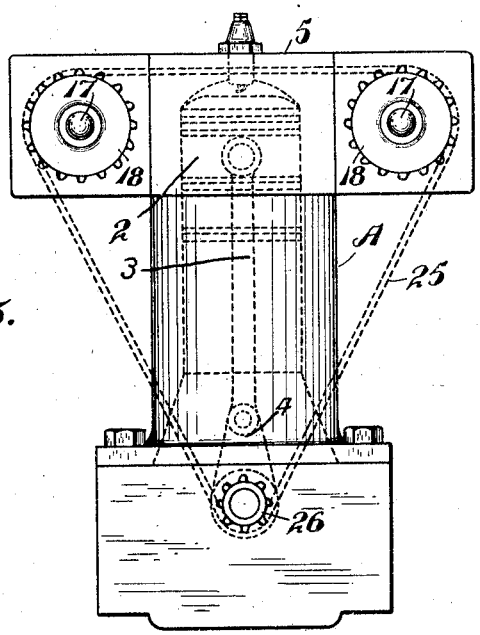
Fig. 3 is an end view of an engine showing the means whereby the valves are rotated in unison.

Referring to the drawings in detail, A indicates the cylinders of an engine; 2, the pistons; 3, the connecting rods; 4, the crank shaft; and 5, the cylinder heads. The heads are in this instance formed integral with the cylinders and water-jackets are provided both for the heads and the cylinders, as shown at 7 and 8. Formed on each side of each cylinder and communicating with the compression chamber 9 of each of the cylinders are ports 10 and 11 and secured on each side of the cylinder heads is a valve casing as shown at 12. Mounted in each casing is a rotary valve 13 in which are provided ports 14. The valve communicating with the ports 10 serves the function of an inlet valve while the valve communicating with the ports 11 serves the function of an exhaust valve.

By referring to Fig. 2 it will be seen that the valves employed are of the sleeve type and cone-shaped. Further, that each valve is protected, both interiorly and exteriorly; that is, each casing 12 is provided with a water-jacket 15 to cool the valves externally and each valve is in turn provided with an interior liner 16 to protect it against the heat of the exhaust gases in one instance and the heat of the incoming explosive mixture in the other instance. Each sleeve valve is supported in their respective casings as shown, and each valve is provided with an outwardly projecting shaft extension 17, on which is secured a sprocket gear 18. Further, by referring to Fig. 2, it will be seen that a coil spring is mounted on each shaft 17, said springs being interposed between the respective casings and the sleeve valves 13 to impose an end thrust on the sleeve valves which will automatically maintain the same in tight engagement with their respective seats, thereby automatically taking up any wear that might take place. The protective liners 16 are rigidly secured at one end of the casing by an annular flange 19, said flange being received by an annular seat formed in the casings 15 for their reception, and being locked in said seats by suitable means, as a key or lug extension 20 fitting a groove 21. The opposite end of each protective liner is provided with a pin extension 22 which enters a seat formed at the inner ends of the shaft sections 17. The protective liners are therefore rigidly supported at each end and are thereby maintained in perfect engagement with the valves shown. The casings, together with the protective liners 16, are provided with ports which are always maintained in alinement with the ports 10 and 11, said ports being shown at 23 and 24, respectively, the only rotating members employed being the respective valves 13.

These valves are provided with ports 14 which are staggered with relation to each other and so arranged that they will communicate with the ports 10, 11, 23 and 24 at certain time periods; that is, the inlet valve ports will communicate with their respective cylinders during the suction stroke of the pistons while the exhaust valve ports will communicate with their respective cylinders during the exhaust stroke of the pistons.

Both valves are rotated in unison by means of the sprocket gears 18 and an endless chain 25, which is driven by means of a sprocket pinion 26 secured on the crank shaft, the driving ratio being one to two of the crank shaft. By referring to Fig. 2, it will be seen that the respective valves are closed at one end and open at the other; similarly, that the protective linings mounted interior of the valves are also closed at one end and open at the other. The incoming and outgoing gases may therefore enter through pipes such as shown at 27 and 28. The gases will then pass longitudinally through the valve and then radially through the ports at predetermined time intervals. The flow of gas is therefore free and unobstructed. Similarly, it should be obvious that large port areas may be provided, thereby permitting an efficient charging and scavenging action to take place. Wear is automatically taken care of by means of the springs shown and lubrication may in this instance be resorted to as each valve is mounted between two wearing faces, to-wit, the protecting liners and the casings proper, said oil being delivered through pipes 30 (see Figs. 1 and 2) which communicate with oil grooves 31 formed between the several contacting faces.

Overheating of the valves cannot take place, due to the fact that the water-jacket entirely surrounds each valve and also due to the fact that the protecting liners employed readily carry away any heat otherwise transmitted.

Free expansion, both longitudinally and transversely, is permitted, as the valves are cone-shaped, and furthermore, free to move longitudinally with relation to the respective seats.

Having thus described my invention, what I claim and desire to secure by Letters Patent is—

1. The combination with the cylinders in an internal combustion engine, of a pair of ports formed in each cylinder, one on each side, a casing secured on each side of the cylinder, a rotary sleeve valve journaled in each casing, a series of ports formed in each valve adapted to register with their respective cylinder ports, a water-jacket formed in each casing and surrounding each sleeve valve, a stationary protective lining interior of each sleeve valve, a central passage formed in said protective lining, a series of ports formed in said protective lining in register with the cylinder ports, a support at each end for the protective lining, means for securing the protective lining against rotation, said protective lining being cone-shaped and said sleeve valves being cone-shaped and a spring means for maintaining each sleeve valve in contact with its seat in the lining.

2. The combination with the cylinders in an internal combustion engine, of a pair of ports formed in each cylinder, one on each side, a casing secured on each side of the cylinder, a series of ports formed on each casing and in register with the cylinder ports, a longitudinally extending cone-shaped valve seat formed in each casing, a water-jacket chamber surrounding each seat, a cone-shaped sleeve valve in each casing engageable with the seat, a series of ports formed in each sleeve valve adapted to register with their respective cylinder ports, a cone-shaped protective lining interior of each sleeve valve, ports formed in said protective linings in register with the cylinder ports, means for retaining the protective lining in engagement with the sleeve valve and means for securing the same against rotary movement.

3. The combination with the cylinders in an internal combustion engine, of a pair of ports formed in each cylinder, one on each side, a casing secured on each side of the cylinder, a series of ports formed on each casing and in register wtih the cylinder ports, a longitudinally extending cone-shaped valve seat formed in each casing, a water-jacket chamber surrounding each seat, a cone-shaped sleeve valve in each casing engageable with the seat, a series of ports formed in each sleeve valve adapted to register with their respective cylinder ports, a cone-shaped protective lining interior of each sleeve valve, ports formed in said protective linings in register with the cylinder ports, a pin formed on one end of each protective lining, said pins projecting into seats formed in the sleeve valves for their reception, an annular collar formed on the opposite end of each protective lining, and an annular seat formed in the respective casings for the reception of said collars.

4. The combination with the cylinders in an internal combustion engine, of a pair of ports formed in each cylinder, one on each side, a casing secured on each side of the cylinder, a series of ports formed on each casing and in register with the cylinder ports, a longitudinally extending cone-shaped valve seat formed in each casing, a water-jacket chamber surrounding each seat, a cone-shaped sleeve valve in each casing engageable with the seat, a series of ports formed in each sleeve valve adapted to register with their respective cylinder ports, a cone-shaped protective lining interior of each sleeve valve, ports formed in said protective linings in register with the cylinder ports, a pin formed on one end of each protective lining, said pins projecting into seats formed in the sleeve valves for their reception, an annular collar formed on the opposite end of each protective lining, an annular seat formed in the respective casings for the reception of said collars, a longitudinal passage formed in each protective member for the escape and admittance of gas, and means for rotating the valves in unison.

5. In an engine of the character described a plurality of cylinders, each having an inlet port on one side and an exhaust port on the opposite side, tapering rotary valves having ports to register with the respective cylinder ports, means to rotate said valves in proper sequence, lining members interior of the valves, said lining members having a central longitudinally disposed passage formed therein and also having ports formed therein registering with the respective adjacent cylinder ports and means to retain said lining members in engagement with the tapering rotary valves and means for securing the lining members against rotation.

6. In an engine of the character described, a plurality of cylinders, each having an inlet port on one side and an exhaust port on the opposite side, tapering rotary valves having ports to register with the respective cylinder ports, means to rotate said valves in proper sequence, lining members interior of the valves, said lining members having a central longitudinally disposed passage formed therein and also having ports formed therein registering with the respective adjacent cylinder ports, means to retain said lining members in engagement with the tapering rotary valves, said means comprising a spring engageable with the rotary valves, and means for securing each lining member against rotary movement.

In testimony whereof I have hereunto set my hand in the presence of two subscribing witnesses.

HERMAN J. MAKOWSKI.

Witnesses:
J. HANAVAN,
NATHANIEL HASLETT.